Figure 1:
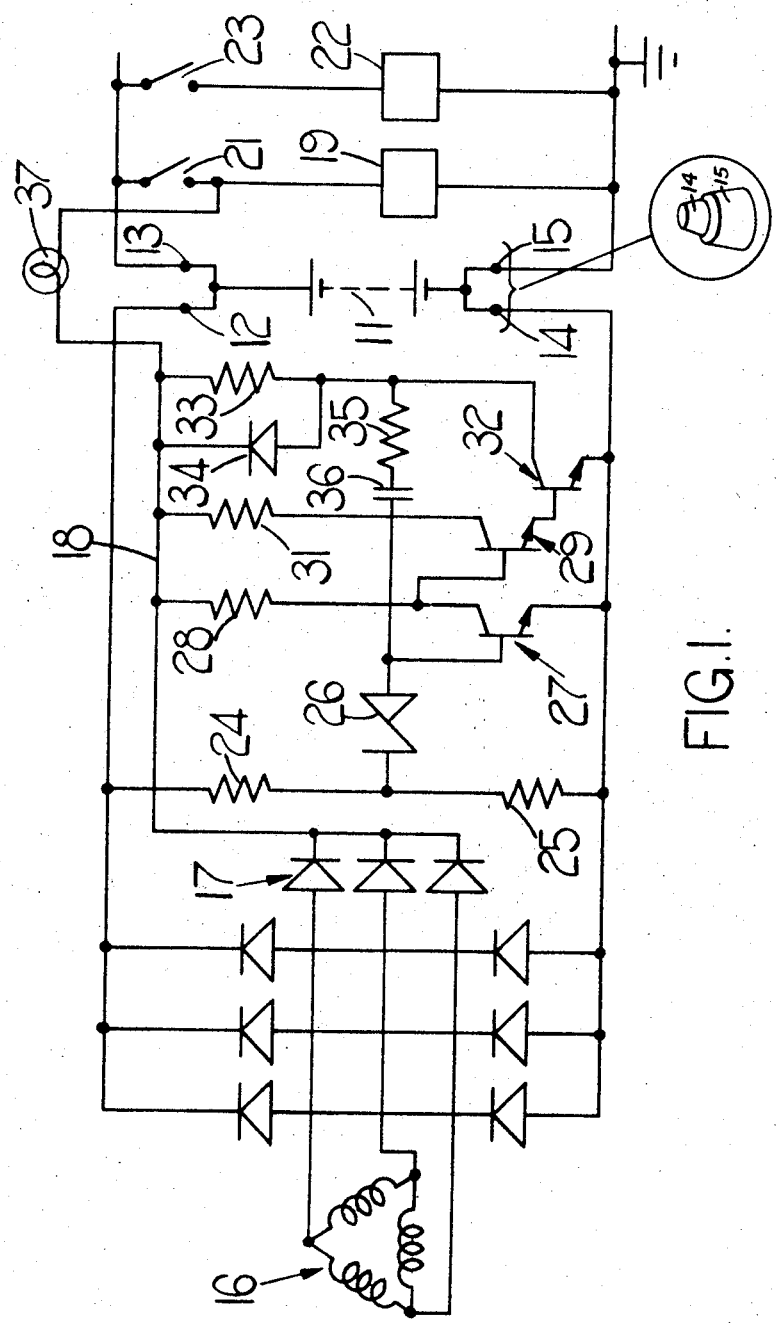

United States Patent [19]
Wright

[11] 3,746,962
[45] July 17, 1973

[54] ELECTRICAL SYSTEMS FOR ROAD VEHICLES
[75] Inventor: Maurice James Wright, Quinton, Birmington, England
[73] Assignee: Joseph Lucas (Industries) Limited, Birmingham, England
[22] Filed: June 17, 1971
[21] Appl. No.: 153,935

[30] Foreign Application Priority Data
June 17, 1970 Great Britain.................. 29,340/70

[52] U.S. Cl.................. 320/61, 136/135 S, 307/10, 317/9 B
[51] Int. Cl............................................. H02j 7/14
[58] Field of Search.................. 320/2, 6, 61, 62–69; 322/28; 317/13, 33, 9 B; 136/181, 135 S; 307/10 B

[56] References Cited
UNITED STATES PATENTS
1,089,549   3/1914   Halbleib.......................... 136/135 S
1,320,747   11/1919  Elderkin......................... 136/135 S
1,889,344   11/1932  Bell................................. 307/10 BP
2,066,010   12/1936  Lindem........................... 307/10 BP
3,029,301   4/1962   Strider............................ 136/181

Primary Examiner—J. D. Miller
Assistant Examiner—Robert J. Hickey
Attorney—Holman & Stern

[57] ABSTRACT

A vehicle electrical system incorporates a battery with first and second positive terminals and first and second negative terminals. The battery is charged by a generator, the output from which is controlled by a voltage regulator connected between the first positive terminal and the first negative terminal. Loads of the vehicle which are susceptible to damage if the battery becomes disconnected are connected between the second positive terminal and the second negative terminal.

1 Claim, 2 Drawing Figures

ELECTRICAL SYSTEMS FOR ROAD VEHICLES

This invention relates to electrical systems for road vehicles.

Although the voltage regulator in a vehicle electrical system maintains a mean voltage level which will not damage any load of the vehicle, transient high voltage and/or current outputs are produced from time to time by the generator. Normally speaking these transients do not harm any of the loads because the battery has a smoothing effect which sufficiently reduces their effect on system voltage. However, in the event of the battery becoming disconnected in use for any reason, for example because of a loose connection, the generator will supply current to the loads on the vehicle without the smoothing effect of the battery, and it is possible for damage to result. This problem has not been particularly serious in the past, but the increasing use of alternators as the generator of a road vehicle leads to higher voltage transients than in the case of a dynamo. Moreover, semi-conductor devices are now commonly used in road vehicles, and such devices are more susceptible to damage by the transients.

The present invention sets out to minimise the disadvantages.

A vehicle electrical system according to the invention includes a battery having first and second positive terminals and first and second negative terminals, a generator for charging the battery, and a voltage regulator for controlling the generator output, the generator output being applied between the first positive terminal and the first negative terminal, and all the loads of the vehicle which are susceptible to damage if the battery becomes disconnected being connected between the second positive terminal and the second negative terminal.

Each pair of terminals on the battery may be constituted by two separate terminals, or a single terminal having two connecting points on it. It will be appreciated that the important point is that there is no connection between the leads from the generator and the leads to the load other than through the battery. In view of this, damage as a result of the battery becoming disconnected can only result in the very unlikely circumstances that the pair of positive leads or negative leads both become disconnected simultaneously, and then become interconnected.

Figure 2:
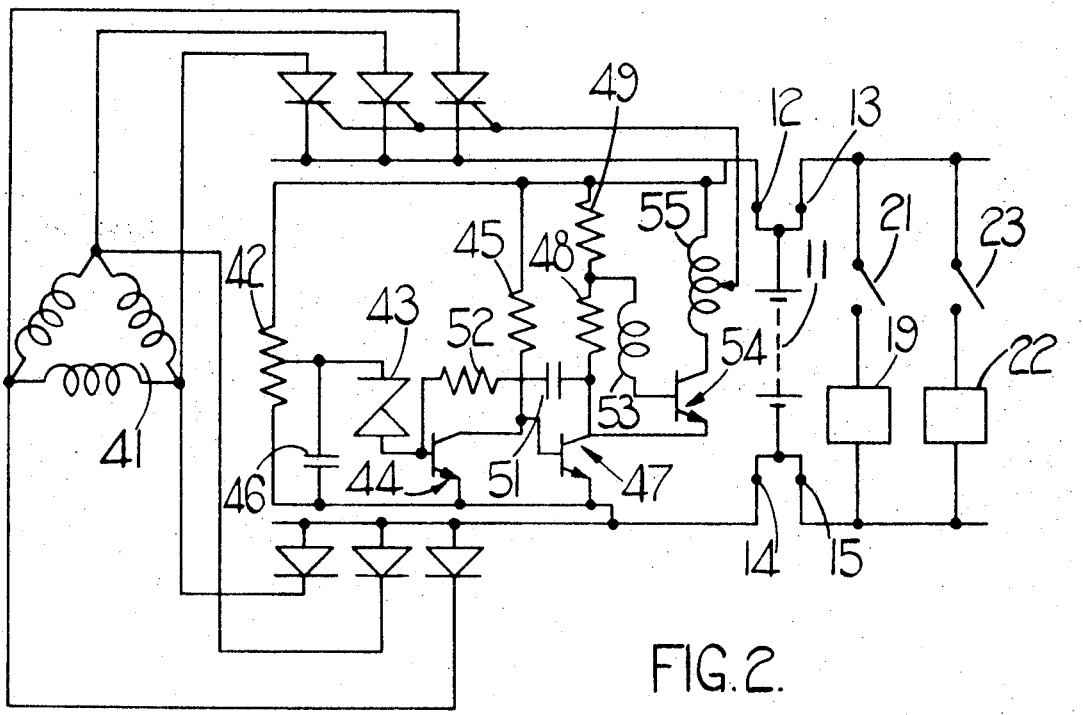

In the accompanying drawings FIGS. 1 and 2 are circuit diagrams illustrating two examples of the invention.

Referring to FIG. 1, the electrical system includes a battery 11 having first and second positive terminals 12, 13 and first and second negative terminals 14, 15. Each pair of positive or negative terminals can be constituted by separate posts on the battery, or by a single post having two separate points of connection thereon. A particularly convenient arrangement in this respect is to have a terminal post which is of stepped, frusto-conical form, providing two tapered portions separated by the step. The two required connections are made to the two tapered portions.

The battery 11 is charged by a field-wound alternator 16 the output of which is fed through a full wave rectifier to the terminals 12, 14 as shown. A subsidiary output is taken through three additional diodes 17 to a supply line 18.

As shown in the drawing, the terminal 15, but not the terminal 14, it earthed. It will be appreciated that one or other of the terminals 14, 15, but not both, can be earthed, and as a practical matter, it is considerably more convenient to provide a live terminal 14 than a live terminal 15. The ignition controlled loads 19 are connected through the ignition switch 21 across the terminals 13, 15, and the lighting system 22 of the vehicle is connected through the lighting switch 23 across the terminals 13 and 15.

The voltage regulator includes a pair of resistors 24, 25 connected directly across the terminals 12, 14, the values of the resistors 24 and 25 being sufficiently high to ensure that the constant current drain of the battery is negligable. The junction of the resistors 24 and 25 is connected through a Zener diode 26 to the base of an n-p-n transistor 27, the emitter of which is connected to the terminal 14 and the collector of which is connected through a resistor 28 to the line 18, and is further connected to the base of an n-p-n transistor 29 having its collector connected through a resistor 31 to the line 18 and its emitter connected to the base of an n-p-n transistor 32. The transistor 32 has its emitter connected to the terminal 14 and its collector connected to the line 18 through the field winding 33 of the alternator, the winding 33 being bridged by a diode 34. The collector of the transistor 32 is connected through a resistor 35 and a capacitor 36 in series to the base of the transistor 27, and the line 18 is connected to the terminal 13 through a warning lamp 37 in series with the ignition switch 21.

When the switch 21 is closed, the lamp 37 is illuminated, and current flowing through the resistor 28 turns on the transistors 29 and 32 so that the field winding 33 is energised. As soon as the alternator produces an output, the voltage on the line 18 turns off the lamp 37. When the voltage reaches a predetermined value, the Zener diode 26 conducts to turn on the transistor 27, removing base current from the transistors 29 and 32. By virtue of the feedback path 35, 36, the circuit oscillates in known manner to maintain a mean current level in the winding 33, so regulating the battery voltage. It will of course be appreciated that the regulator shown in the drawing is by way of example only, and that a variety of regulators can be used.

It will be appreciated that with the arrangement shown, the sole connection between the alternator 16 and the loads which are susceptible to damage is the battery 11, so that it is virtually impossible for the battery to become disconnected and for any load to be connected directly to the alternator.

In FIG. 1 the regulator is effectively connected between the terminals 12 and 14, such that its action is maintained in the event of the battery becoming disconnected from the alternator, thereby controlling power dissipation in the field winding.

The physical connection of the voltage sensing potentiometer 24, 25 is preferably made as close as possible to the battery terminals 12, 14 to ensure accurate sensing. Where the regulator is incorporated within the alternator housing, the alternator/battery and regulator/battery cables may be combined in a single harness as high and low current cables respectively, the low current cable being electrically connected to the high current cable close to the battery terminal.

While it is desirable that the regulator controls the alternator field current on battery disconnection, it will be appreciated that the electrical system of the vehicle can be protected with other regulators arranged such that the field current will not be controlled by the regulator under such conditions.

Referring now to the example shown in FIG. 2, the battery 11 with its terminals 12, 13, 14 and 15, and the loads 19, 22 with their associated switches 21 and 23 are connected as in FIG. 1. However, in this case the alternator is a permanent magnet alternator 41, the phase points of which are connected to the anodes of three thyristors and the cathodes of three diodes. The cathodes of the thyristors are connected to the terminal 12, whilst the anodes of the diodes are connected to the terminal 14, and the arrangement is such that as long as gate current is supplied to the thyristors, the output from the alternator is rectified and used to charge the battery. However, if no gate current is applied to the thyristors, then each tyristor will turn off as soon as it is reverse biased by the alternator 41, so that no power will be supplied to the battery.

The regulator for controlling conduction of the thyristors includes a resistor 42 connected between the terminals 12 and 14, a point on the resistor being connected through a Zener diode 43 to the base of an n-p-n transistor 44, the emitter of which is connected to the terminal 14 and the collector of which is connected through a resistor 45 to the terminal 12. The variable point on the resistor 42 is also connected to the terminal 14 through a capacitor 46, and the collector of the transistor 44 is further connected to the base of an n-p-n transistor 47, the emitter of which is connected to the terminal 14 and the collector of which is connected through a pair of resistors 48, 49 in series to the terminal 12. The collector of the transistor 47 is connected through a capacitor 51 and a resistor 52 to the base of the transistor 54, and the junction of the resistors 48, 49 is connected through a winding 53 to the base of an n-p-n transistor 54, the emitter of which is connected to the collector of the transistor 47 and the collector of which is connected to a winding 55 to the terminal 12. The winding 55 is magnetically coupled to the winding 53, and a point on the winding 55 is connected to the gates of the thyristors.

The regulator is simply an oscillator which when the Zener diode 43 is not conducting provides gate current to the thyristor. However, when a predetermined battery voltage is reached, the Zener diode 43 conducts, and stops the oscillator from operating, so that each thyristor turns off as soon as it is reverse biased.

The starter motor is not shown in either drawing, but can be connected in any convenient position. Thus, the starter motor can be connected between the terminals 12, 14, and in this case it is convenient to connect one of the output leads of the generator to the lead of the starter motor, both leads then being connected to one of the terminals 12, 14.

I claim:

1. A vehicle electrical system including a battery having first and second positive terminal and first and second negative terminals, a generator for charging the battery, and a voltage regulator for controlling the generator output, the generator output being applied between the first positive terminal and the first negative terminal, and all the loads of the vehicle which are susceptible to damage if the battery becomes disconnected being connected between the second positive terminal and the second negative terminal, at least one pair of terminals being constituted by a single post of stepped frusto-conical form providing two tapered portions separated by the step, the required connections being made to the two tapered portions respectively.

* * * * *